Patented Aug. 25, 1942

2,293,774

UNITED STATES PATENT OFFICE 2,293,774

PREPARATION OF ALPHA TOLYLETHYL ALCOHOL

Frank J. Soday, Upper Darby, Pa., assignor to The United Gas Improvement Company, a corporation of Pennsylvania No Drawing. Application August 16, 1939, Serial No. 290,501

2 Claims. (Cl. 260—618)

In general, this invention relates to the preparation of alpha tolylethyl alcohols.

More particularly, this invention relates to the preparation of alpha methyl styryl alcohols by the hydrolysis of alpha methyl styrene derivatives containing substituent halogen groups capable of being hydrolyzed and replaced with hydroxyl groups.

The preparation and physical properties of certain of the tolylethyl alcohols have been described in the prior art and literature. However, the processes which have been developed for the preparation of these compounds are, in general, highly involved, and the preparation of these materials on a commercial scale by the prior art methods has not proved practical.

For example one method of preparing an alpha-tolylethyl alcohol, as described in the literature, consists of reducing 4-methyl acetophenone to produce an alpha tolylethyl alcohol of the following formula:

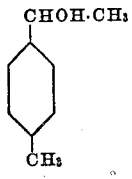

Alpha para-tolylethyl alcohol

Such methods are very costly and, therefore, are not suitable for the commercial production of alpha tolylethyl alcohol.

I have found that alpha tolylethyl styryl alcohols may be readily prepared by the hydrolysis of alphamethyl styrene halogen derivatives, as will be more fully explained hereinafter.

Alpha methyl styrene halogen derivatives from any source may be utilized in the production of alpha tolylethyl alcohols in accordance with my invention. A convenient source of these derivatives are hydrocarbon fractions containing nuclearly substituted methyl styrene obtained in the manufacture of artificial gas.

In various processes for the manufacture of artificial gas, wherein petroleum oil is pyrolytically decomposed, considerable quantities of tar are produced and the gas contains substantial quantities of readily condensable material. Both condensates obtained from the artificial gas, and the light oil obtained upon distillation of the residual tar constitute sources for many aromatic hydrocarbons. Included among these aromatic hydrocarbons are the unsaturated cyclic olefines, and in particular the nuclearly substituted methyl styrenes.

The nuclearly substituted methyl styrenes have the following general structural formula.

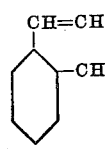 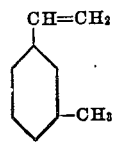 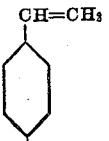

Ortho methyl styrene    Meta methyl styrene    Para methyl styrene

For convenience, the foregoing nuclearly substituted methyl styrenes will be referred to as a class simply as "methyl styrenes."

These methyl styrenes may be readily converted into methyl styrene halogen derivatives, including the alpha derivatives, due to the unsaturated nature of the styryl radical.

In my co-pending application Serial No. 280,725 filed June 23, 1939, I have described a process by which methyl styrenes may be converted into methyl styrene hydrohalides by the direct addition of hydrogen halides to ortho, meta, and para methyl styrenes. Alpha methyl styrene hydrohalides, and mixtures thereof, may be prepared by the processes therein described with particularly desirable results.

The alpha methyl styrene hydrohalides thus prepared, may, if desired, be utilized for the production of alpha tolylethyl alcohols by the processes hereinafter described.

In the description which follows, the formation of alpha, para tolylethyl alcohol is described in detail, but it is to be understood that the process is, in general, equally applicable to the preparation of alpha, ortho and alpha, meta tolylethyl alcohol, and that reference to alpha, para tolylethyl alcohols is for convenience only in representing the class consisting of alpha, ortho; alpha, meta; and alpha, para, tolylethyl alcohols.

When an alpha methyl styrene halogen derivative, containing a substituent halogen in the styryl radical (i. e., in the side chain) capable of being hydrolyzed and replaced with an hydroxyl group, is treated with a hydrolyzing agent, hydrolysis takes place and the substituent halogen is replaced with an hydroxyl group thus forming alpha tolylethyl alcohol.

The following equation illustrates the hydrolysis of an alpha para methyl styrene halogen derivative to produce alpha, para tolylethyl alcohol.

For the production of alpha para tolylethyl alcohol the reaction is:

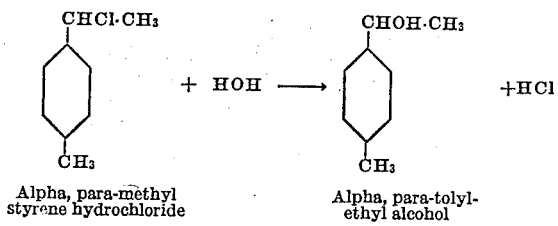

| Alpha, para-methyl styrene hydrochloride | Alpha, para-tolyl-ethyl alcohol |

The hydrolysis of alpha methyl styrene halogen derivatives may be carried out in any suitable manner, and with any suitable hydrolyzing agent.

In general, alkaline hydrolyzing agents, such as sodium carbonate, sodium hydroxide, potassium hydroxide, potassium carbonate, calcium hydroxide, sodium bicarbonate, and similar alkalies, suitably in the form of aqueous solutions, may be used for the hydrolysis of alpha methyl styrene halogen derivatives.

Batch, multiple batch, or continuous hydrolyzing methods may be employed in the production of alpha tolylethyl alcohols by hydrolysis of alpha methyl styrene halogen derivatives.

The hydrolysis reaction may be carried out at atmospheric, subatmospheric, or superatmospheric pressures, as desired.

Solvents and diluents may also be added, if desired, although they are usually not necessary.

When solvents are employed during the hydrolyzing reaction, emulsifying agents may be used, if desired, in order to insure a better contact between the phases.

Emulsifying agents may also be used in the absence of solvents or diluents, if desired.

One suitable method for effecting hydrolysis of alpha methyl styrene halogen derivatives comprises refluxing them with hydrolyzing agents for a period of three to eight hours, cooling, separating the oil and water layers and obtaining alpha tolylethyl alcohol from the oily layer by fractional distillation.

When this method of hydrolysis is employed, the yield of alpha tolylethyl alcohol obtained may be increased, if desired, by extracting the aqueous layer with an organic solvent, such for example as ether, and adding the organic solvent extract to the oily layer. Generally speaking, the organic solvent must then be removed prior to the separation of the alpha tolylethyl styryl alcohols from the oily layer. This may be done, for example, by distillation at atmospheric pressure.

Prior to the separation of the alpha tolylethyl alcohol from the oily layers, it has generally been found advisable to dry the oily layer over desiccating agents, such, for example, as potassium carbonate and anhydrous sodium sulfate.

Illustrative of the methods of preparing various alpha tolylethyl alcohols, the following example is given:

*Example I*

An alpha, para-methyl styrene hydrochloride, having the following general formula

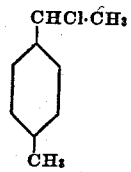

was prepared in accordance with the process described in my above referred to co-pending application. This para methyl styrene hydrochloride fraction had the following physical properties:

Boiling point = 56 to 62° C. at 2.5 mm.
Density (D 20/4) = 1.0449
Refractive index (n 20/d) = 1.5298

It was hydrolyzed to alpha, para-tolylethyl alcohol by the following procedure.

Approximately 500 parts by weight of this alpha, para-methyl styrene hydrochloride was refluxed with approximately 430 parts by weight of sodium carbonate in the form of a 15% aqueous solution for a period of approximately five hours. The reaction mixture was then cooled and the upper oily layer separated, after which the aqueous residue was extracted with ether and the ether extracts added to the oily fraction. The combined oily solution was then dried with potassium carbonate and the ether portion removed by distillation. The residue was then fractionated in vacuo, whereupon there was obtained approximately 180 parts by weight of alpha, para-tolylethyl alcohol having the following general structural formula:

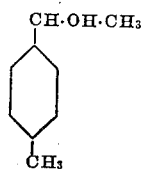

This material was a colorless, slightly viscous liquid with an agreeable rose odor with a leafy undertone, and had the following physical properties:

Boiling point at 3 mm. = 73–75° C.
Boiling point at 13 mm. = 104–107° C.
Density (D 20/4) = 0.9944
Refractive index (n 20/d) = 1.52458

It will be appreciated, of course, that alpha tolylethyl alcohol may be prepared from pure methyl styrene or hydrocarbon fractions containing methyl styrene by a continuous process which may, for example, comprise first converting the methyl styrene content thereof into alpha methyl styrene halogen derivatives capable of being hydrolyzed, and thereafter effecting hydrolysis of the derivatives.

For example, an alpha para methyl styrene hydrohalide may be prepared from a para methyl styrene fraction obtained by the distillation of light oil from oil gas. This alpha, para methyl styrene hydrohalide may then be hydrolyzed to form the desired alpha para tolylethyl alcohol.

The tolylethyl alcohols have many industrial uses. This is particularly true of the alpha tolylethyl alcohols. Merely by way of example, alpha para tolylethyl alcohol may be used as an ingredient in perfumes, odorants, creams, sprays and cosmetic preparations in general.

For certain purposes, in which a pronounced rose-like odor is required, the alpha-isomer of para tolylethyl alcohol will be found to be superior to the beta-isomer.

One particularly important application of the tolylethyl alcohols is their use as addition agents for soap and similar compounds. Tolylethyl alcohols, when added to soap or similar products such as synthetic detergents and the like, serve to not only impart thereto desirable odors but also serve to effectually seal the pores of such materials to prevent efflorescence and deterioration.

The addition of tolylethyl alcohols to bar soap, as odorants, has been found to be a particularly advantageous practice because of the stable nature of this odorant. A large number of perfumes now being used for this purpose suffer from a lack of stability, and when added to soap often results in an undesirable odor of the soap after any extended period of storage thereof, due to oxidation or conversion of the odorants into materials having undesirable or unpleasant odors.

For example, exposure to light and air of soaps containing such odorants as phenyl acetaldehyde, benzaldehyde, anisic aldehyde, citral, lemon oil, citronellal, hydroxy citronellal, vanillin, and heliotropin, results in the development of disagreeable and unpleasant odors by oxidation or by action of other constituents of the soap.

Furthermore, certain of these odors, such as, for example, vanillin and others having phenolic constituents, when exposed to light and air, develop a dark color which is generally undesirable in soaps and soap products.

Tolylethyl alcohols possess none of these undesirable properties. They are completely stable and resist the action of light and air indefinitely. They impart delicate, flowery odors to the soap and similar products. They have, therefore, been found to be highly desirable as odorants for such materials.

As to the use of tolylethyl alcohols as sealing agents to seal the pores in bar soap and similar prducts, it may be mentioned that the reduction in quality of bar soap in the industry due to efflorescence represents a very considerable economic loss. Bar soap which has lost water by efflorescence presents an unsightly appearance, becoming chalk white and opaque in the case of white soap. In colored soap, the effect is even more pronounced as the area of efflorescence is marked by an opaque, off-colored area. The addition of a tolylethyl alcohol to a soap or a soap product serves to effectively seal the pores on the surface thereof and prevents any loss of water by efflorescence. This property of the tolylethyl alcohol which prevents efflorescence and deterioration, when combined with the highly advantageous odorizing properties of these alcohols, makes them highly suitable for use in the soap industry.

Tolylethyl alcohols may be incorporated in soap in any desired manner. The quantity used will, in general, depend upon a number of factors, but quantities in the range of 0.05% to 5% by weight may be regarded as typical. The tolylethyl alcohols may be used as such or may be added in combination with other perfumes or additive agents.

Illustrative of the method of incorporation of a tolylethyl alcohol in soap or soap products, the following example is given.

Example II

Approximately 98 parts by weight of dried aged soap chips and 2 parts by weight of a tolylethyl alcohol was thoroughly mixed in an amalgamator, after which the mixture was fed into a milling machine. The milled soap was then fed into a plodder, which compressed the milled soap chips to a bar. This bar was subsequently cut into cakes of the desired size, after which the cakes were stamped and molded into final shape in a soap press. The bar soap thus obtained did not effloresce even after long exposures to light and air, and maintained its original roselike odor unchanged after long periods of open exposure.

In addition to its use in bar soap, tolylethyl alcohol may also be employed to advantage in other types of soap, such as, for example, flake, chip, powder, or bead form of soaps. These alcohols may also be incorporated in synthetic detergents, of which sodium lauryl sulfonate may be mentioned as an example.

While representative alpha tolylethyl alcohols and procedures for the preparation thereof have been particularly described, it is to be understood that these are by way of illustration only. Therefore, changes, omissions, additions, substitutions, and/or modifications may be made within the scope of the claims without departing from the spirit of the invention.

I claim:

1. A process for the preparation of an alpha-tolylethyl alcohol which comprises the steps of treating alpha-halo-ethyltoluene with an aqueous solution of a hydrolyzing agent selected from the class consisting of sodium carbonate, sodium hydroxide, potassium hydroxide, potassium carbonate, calcium hydroxide and sodium bicarbonate, and then separating alpha-tolylethyl alcohol from the resulting oily layer.

2. A process for the preparation of an alpha-tolylethyl alcohol which comprises the steps of treating alpha-halo-ethyltoluene with an aqueous solution of sodium carbonate, and then separating alpha-tolylethyl alcohol from the resulting oily layer.

FRANK J. SODAY.